(12) United States Patent
Voss et al.

(10) Patent No.: US 9,529,587 B2
(45) Date of Patent: Dec. 27, 2016

(54) REFACTORING DATA FLOW APPLICATIONS WITHOUT SOURCE CODE CHANGES OR RECOMPILATION

(71) Applicant: Intel Corporation, Santa Clara, CA (US)

(72) Inventors: Michael J. Voss, Mahomet, IL (US); Vasanth R. Tovinkere, Portland, OR (US); Jaime Arteaga, Champaign, IL (US); Sergey Vinogradov, Niz (RU)

(73) Assignee: Intel Corporation, Santa Clara, CA (US)

( * ) Notice: Subject to any disclaimer, the term of this patent is extended or adjusted under 35 U.S.C. 154(b) by 63 days.

(21) Appl. No.: 14/576,291

(22) Filed: Dec. 19, 2014

(65) Prior Publication Data

US 2016/0179504 A1    Jun. 23, 2016

(51) Int. Cl.
*G06F 9/44* (2006.01)

(52) U.S. Cl.
CPC .. *G06F 8/70* (2013.01); *G06F 8/72* (2013.01)

(58) Field of Classification Search
None
See application file for complete search history.

(56) References Cited

U.S. PATENT DOCUMENTS

| | | | |
|---|---|---|---|
| 7,207,038 B2 | 4/2007 | Bicsak et al. | |
| 7,895,586 B2 * | 2/2011 | Ozone | G06F 15/7867 712/201 |
| 2004/0088666 A1 * | 5/2004 | Poznanovic | G06F 17/5045 716/105 |
| 2004/0088691 A1 * | 5/2004 | Hammes | G06F 17/5022 717/158 |
| 2011/0161575 A1 | 6/2011 | Collins | |
| 2012/0144376 A1 * | 6/2012 | Van Eijndhoven | G06F 8/456 717/146 |
| 2014/0040855 A1 * | 2/2014 | Wang | G06F 9/4436 717/107 |
| 2014/0359573 A1 * | 12/2014 | Ajith Kumar | G06F 11/3612 717/113 |
| 2015/0067834 A1 * | 3/2015 | Pistoia | G06F 8/433 726/22 |

OTHER PUBLICATIONS

NPL—Murphy-Hill—Successful Refactoring-2008, ICSE '08 May 10-18, 2008, ACM.*
NPL—Semantic1—Control and Data flow analysis—2013, Located at http://www.semdesigns.com/Products/DMS/FlowAnalysis.html.*
NPL—Semantic2—Refactoring tool—2013, located at http://www.semdesigns.com/Products/DMS/Refactoring.html?Home=Main.*

(Continued)

*Primary Examiner* — Qing Chen
*Assistant Examiner* — Hossain Morshed
(74) *Attorney, Agent, or Firm* — Jordan IP Law, LLC

(57) ABSTRACT

Systems and methods may provide refactoring data flow applications without source code changes or recompilation. An apparatus may create a map file that describes how an original graph structure and node properties are mapped to a new structure and set of properties. A runtime system aware of the mapping may transform a graph that is constructed by the data flow application into the new structure at runtime.

19 Claims, 6 Drawing Sheets

(56) References Cited

OTHER PUBLICATIONS

NPL—Widmer—Eclipse Corner Artcle—2006, located at http://www.eclipse.org/articles/article.php?file=Article-Unleashing-the-Power-of-Refactoring/index.html.*

Book Title: Refactoring: Improving the Design of Exisiting Code By Martin Fowler, 2002 located at: https://www.csie.ntu.edu.tw/~r95004/Refactoring_improving_the_design_of_existing_code.pdf.*

NPL—Semantic1—Control and Data Flow Analysis-2013, located at: http://www.semdesigns.com/Products/DMS/FlowAnalysis.html 2013.*

NPL—Semantic2—Refactoring Tool—2013, located at: http://www.semdesigns.com/Products/DMS/Refactoring.html?Home=Main 2013.*

International Search Report and Written Opinion for PCT Patent Application No. PCT/US2015/064442, mailed Apr. 1, 2016, 12 pages.

Christian Haubelt et al, "Using Stream Rewriting for Mapping and Scheduling Data Flow Graphs onto Many-Core Architectures", 2013 Asilomar Conference on Signals, Systems and Computers, IEEE, Nov. 3, 2013, pp. 1431-1435.

Marbod Hopfner, "Source Code Analysis, Management, and Visualization for PROLOG", University of Wurzburg, Nov. 27, 2008, 312 pages.

Lars Middendorf et al., "Dynamic Task Mapping onto Multi-Core Architectures through Stream Rewriting", 2013 International Conference on Embedded Computer Systems: Architectures, Modeling and Simulation (SAMOS XIII), IEEE, Jul. 15, 2013, pp. 196-204.

Michael Voss, Intel Developer Zone, Flow Graph Designer, https://software.intel.com/en-us/articles/flow-graph-designer, Mar. 7, 2014, 5 pages.

* cited by examiner

REFACTORING DATA FLOW APPLICATIONS WITHOUT SOURCE CODE CHANGES OR RECOMPILATION

TECHNICAL FIELD

Embodiments generally relate to data flow programming. More particularly, embodiments relate to refactoring the structure of a data flow graph application without making source code changes.

BACKGROUND

Data flow programming may involve developing an application that is constructed as computational "nodes" that execute user or predefined functions. These nodes may be connected by "edges" that represent the communication channels between the computations. As messages arrive at a node, the node may apply its function and then may forward the result of the function to other nodes that may be connected to it by its out-going edges. If all data dependencies are expressed using edges, the parallelism in the application may become simple to infer and a runtime system may use the parallelism to exploit the computational resources available on a platform, whether they may be cores in a multiprocessor or systems in a cluster.

When developing a data flow application, developers may make decisions about the structure of the flow graph. For example, the developers may choose what code should be encapsulated in each node and what dependencies may be expressed as edges. In distributed memory implementations, decisions may be made about placement on devices or data transfers across memory domains. Additional properties may also be able to be set on the nodes and edges. There may be many ways to express the same algorithm as a data flow graph. The choice of graph structure, placement and node properties may impact the resulting performance and scalability of the parallel execution, and therefore iterative tuning of the graph structure may be needed to obtain optimal performance.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
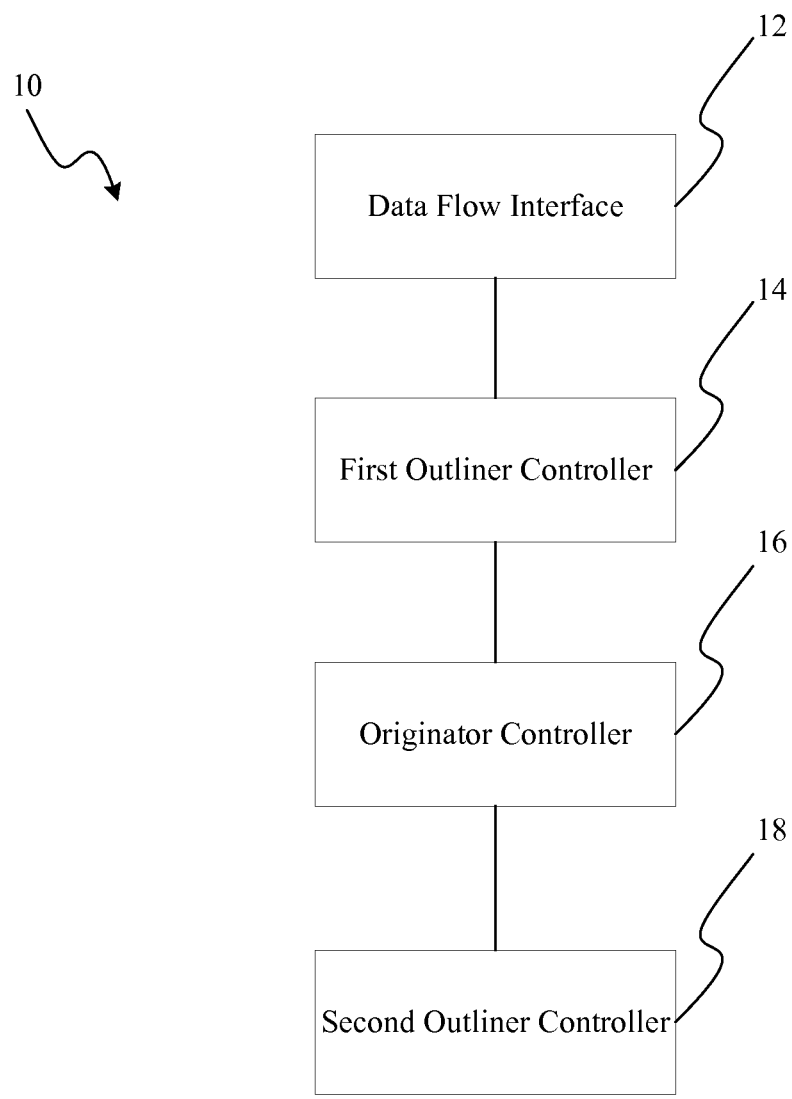
FIG. 1 is a block diagram of an example of a computing system according to an embodiment.

In FIG. 1, a computing system 10 to support refactoring, according to an embodiment is described, wherein a data flow interface 12 may be used to obtain a data flow graph application. A first outliner controller 14 may engage a runtime system and a graph library (see FIG. 4). The runtime system and the graph library together may execute and profile an original flow graph (see FIG. 4). The original flow graph may be profiled to obtain knowledge about its structure and behavior. Additionally, an originator controller 16 may be used to create a map file based on one or more refactoring inputs (see FIG. 4), wherein the map file may be created automatically or in response to a user refactoring input at runtime. The map file may describe how the original flow graph structure and node properties may be mapped to a new structure and set of properties. A runtime system that may be aware of the map file may transform the original flow graph that is constructed by the data flow graph application into the new structure at runtime (see FIG. 4). A mapping process may allow developers to decrease development time by enabling them to iteratively tune the data flow graph application without editing and rebuilding the source code before each experiment. The originator controller 16 may receive the refactoring inputs via a graphical user interface (see FIG. 4).

The refactoring inputs may include, but are not limited to situations where: a set of independent nodes are aggregated into a single node to reduce the overhead of spawning and scheduling independent tasks; a buffering node is replaced with a different buffering node type (e.g., a "queue node" may be replaced with an unordered "buffer node", or a buffer node with a priority queue node); an allowed concurrency for a "function node" or "multifunction node" is changed as when a "parallel node" that may consume excessive memory per instance may be changed from unlimited concurrency to serial concurrency; a limit for a "limiter node" (e.g., a node that limits the number of items that can pass through it) is increased or decreased; and in a prototype implementation of a distributed version of a flow graph that is currently under development, "distributor nodes" may be placed where communication may be allowed between devices. The node terminologies used herein are to facilitate discussion only and may vary depending on the flow graph API (application programming interface) being used. At runtime, the runtime system may be used to assist with inserting the aforementioned nodes without changing the source code or compiled executables associated with the data flow graph application.

A second outliner controller 18 may be used to re-profile the data flow graph application, wherein the source code and one or more compiled executables associated with the data flow graph application may not be modified during the re-profiling process. More particularly, the map file and a refactoring graph library may be used by the second outliner controller 18 in the re-profile action to obtain a refactored flow graph. The refactoring graph library may be used to interpret the map file and follow directions given by the map file during execution of the refactored flow graph. Thus, the changes afforded by the second outliner controller 18 may be applied at runtime to evaluate efficacy. If performance improves after a change is applied as evidenced by the refactored flow graph, a developer may decide to hard-code the changes, update the source-code and recompile, or may choose to allow the runtime system to continue to apply refactoring techniques using refactoring inputs at runtime.

Figure 2:
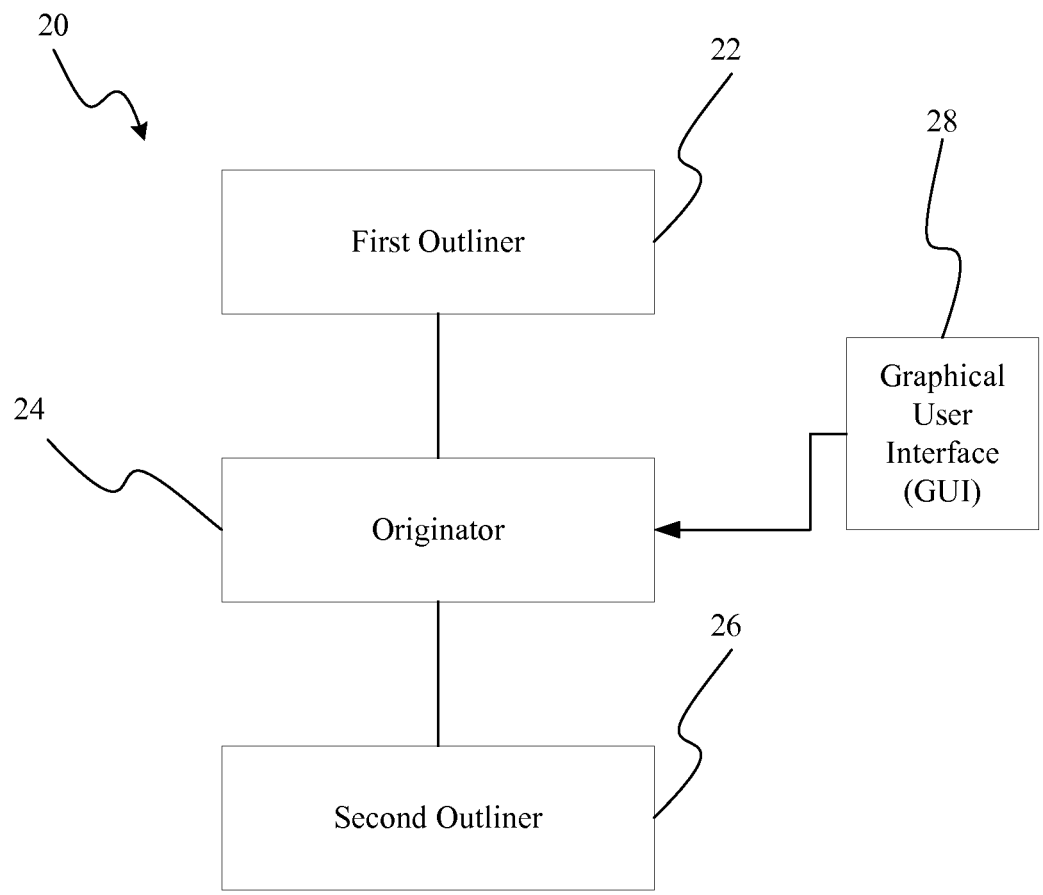
FIG. 2 is a block diagram of an example of an apparatus according to an embodiment.

FIG. 2 describes an apparatus 20 that may be used to refactor the data flow graph application. In the illustrated example, a first outliner 22 profiles the data flow graph application using a runtime system and a graph library (see FIG. 4). As already discussed, an original flow graph may be obtained from the profile by the first outliner 22. Additionally, an originator 24 may create a map file using one or more refactoring inputs. The map file may be created automatically by the originator 24 or a user may provide refactoring input at runtime. The originator 24 may also use a refactoring graph library to interpret directions given by the map file. The refactoring inputs may be received by the originator 24 via a graphical user interface 28. As already noted, the map file may describe how a structure of the original flow graph may be related to a structure of a subsequent refactored flow graph. In addition, a second outliner 26 may re-profile the data flow graph based on the map file and the refactoring graph library. A refactored flow graph may be created when the second outliner 26 re-profiles the data flow graph. The second outliner 26 may re-profile the data flow graph application without modifying source code or one or more compiled executables that are associated with the data flow graph application.

Figure 3:
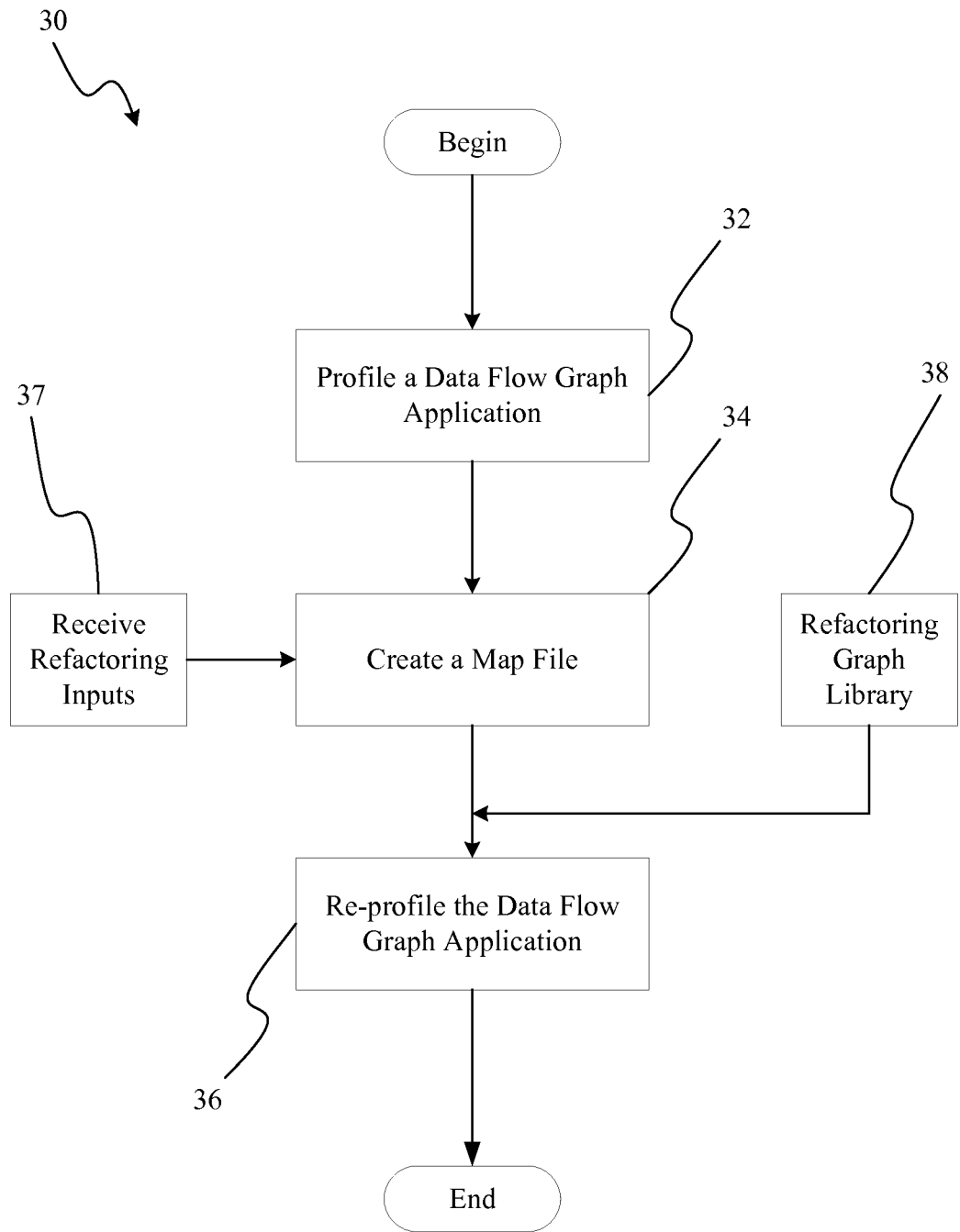
FIG. 3 is a flowchart of an example of a method to refactor data flow graph applications.

FIG. 3 illustrates an example of a method 30 to refactor data flow graph applications according to an embodiment. The method 30 may be implemented as one or more modules in executable software as a set of logic instructions stored in a machine- or computer-readable storage medium of a memory such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof.

In this example, a data flow graph application with an associated source code may be profiled at block 32 using a runtime system and a graph library. An original flow graph may be executed and profiled using the runtime system and the graph library (see FIG. 4). A map file may be created at block 34 based on receiving one or more refactoring inputs at block 37. The map file may describe how the original graph structure and node properties are to be mapped to a new structure and set of properties. A runtime system that is aware of the mapping language may transform the graph that is constructed by the data flow graph application into a new structure at runtime. The refactoring inputs may be created one or more of automatically or in response to a user refactoring input at runtime via a graphical user interface. A refactoring graph library may interpret the map file in context to a user's desired application. The refactoring graph library may be used when the data flow graph application is re-profiled. The data flow graph application may be re-profiled at block 36 using the map file and the refactoring graph library to obtain a refactored flow graph. The source code and one or more compiled executables associated with the data flow graph application may not be modified. A developer may decide to hard-code by changing the source code and recompile, or allow the runtime system to continue to apply refactoring at runtime.

Figure 4:
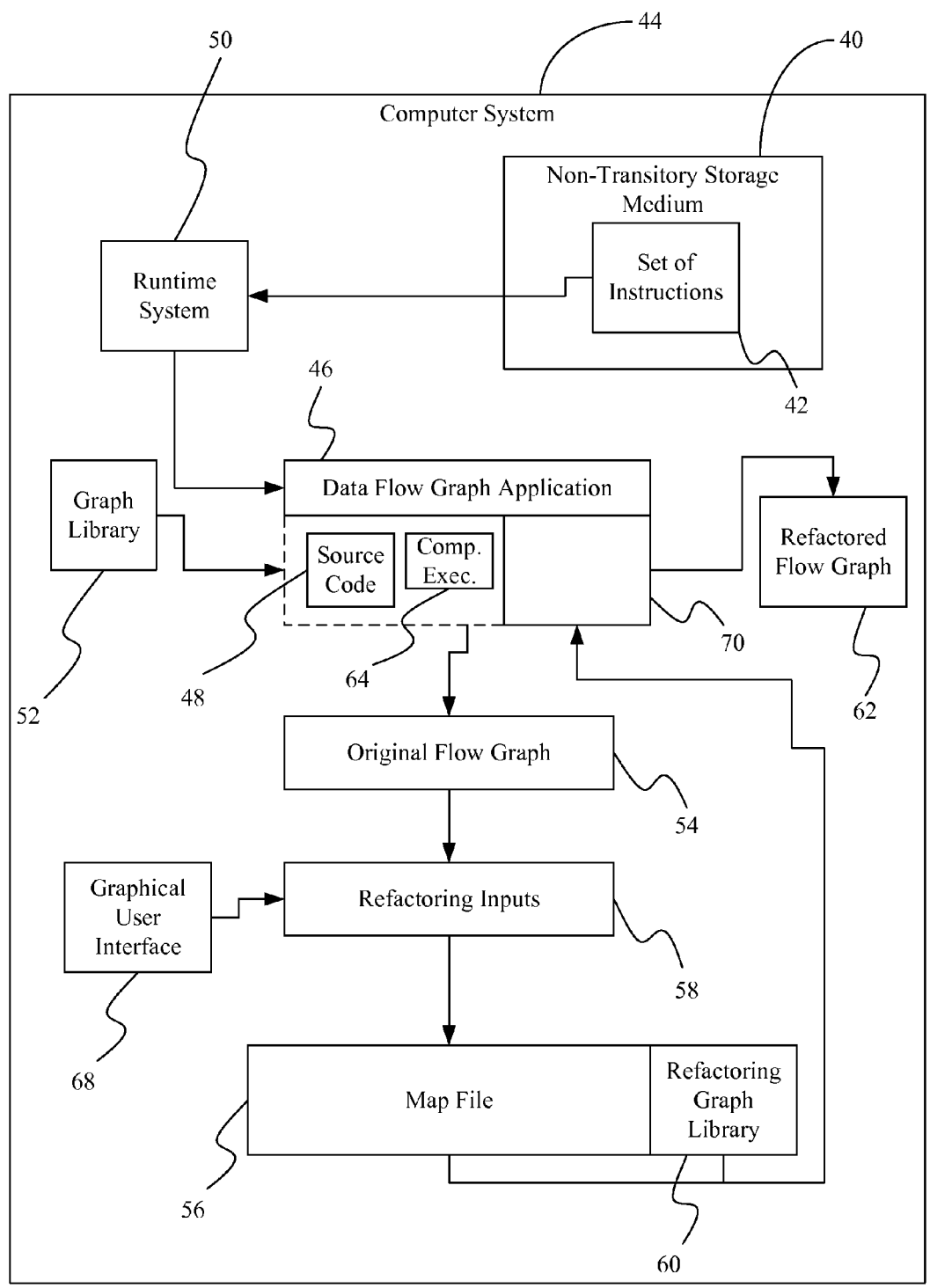
FIG. 4 is a block diagram of an example of a computing system according to an embodiment.

In FIG. 4, a non-transitory storage medium 40 with a set of instructions 42 to enable a computing system 44 to refactor a data flow graph application is described. The set of instructions 42 may instruct a runtime system 50 to profile the data flow graph application using a graph library at runtime 46. An original flow graph 54 may be created as a result of the aforementioned profiling of the data flow graph application. The original flow graph 64 may be subjected to refactoring inputs 58 that may change original graph structure and node, type, aggregation, etc., and may create a map file 56. The refactoring inputs 58 may be implemented automatically or manually via a graphical user interface 68.

When the map file 56 is created, it may generate a refactoring graph library 60. The map file 56 and the refactoring graph library 60 may be used to obtain a re-profiled the data flow graph application 70 and may create a refactored flow graph 62 without modifying source code 48 and compiled executables 64 that may be associated with the data flow graph application 46. The map file 56 may describe how a structure of the original flow graph is related to a structure of the refactored flow graph 62. Therefore, iterative tuning of the data flow graph application structure may be obtained before a developer decides to hard-code and modify the source code 48 and the compiled executables 64 associated with the data flow graph application.

Figure 5:
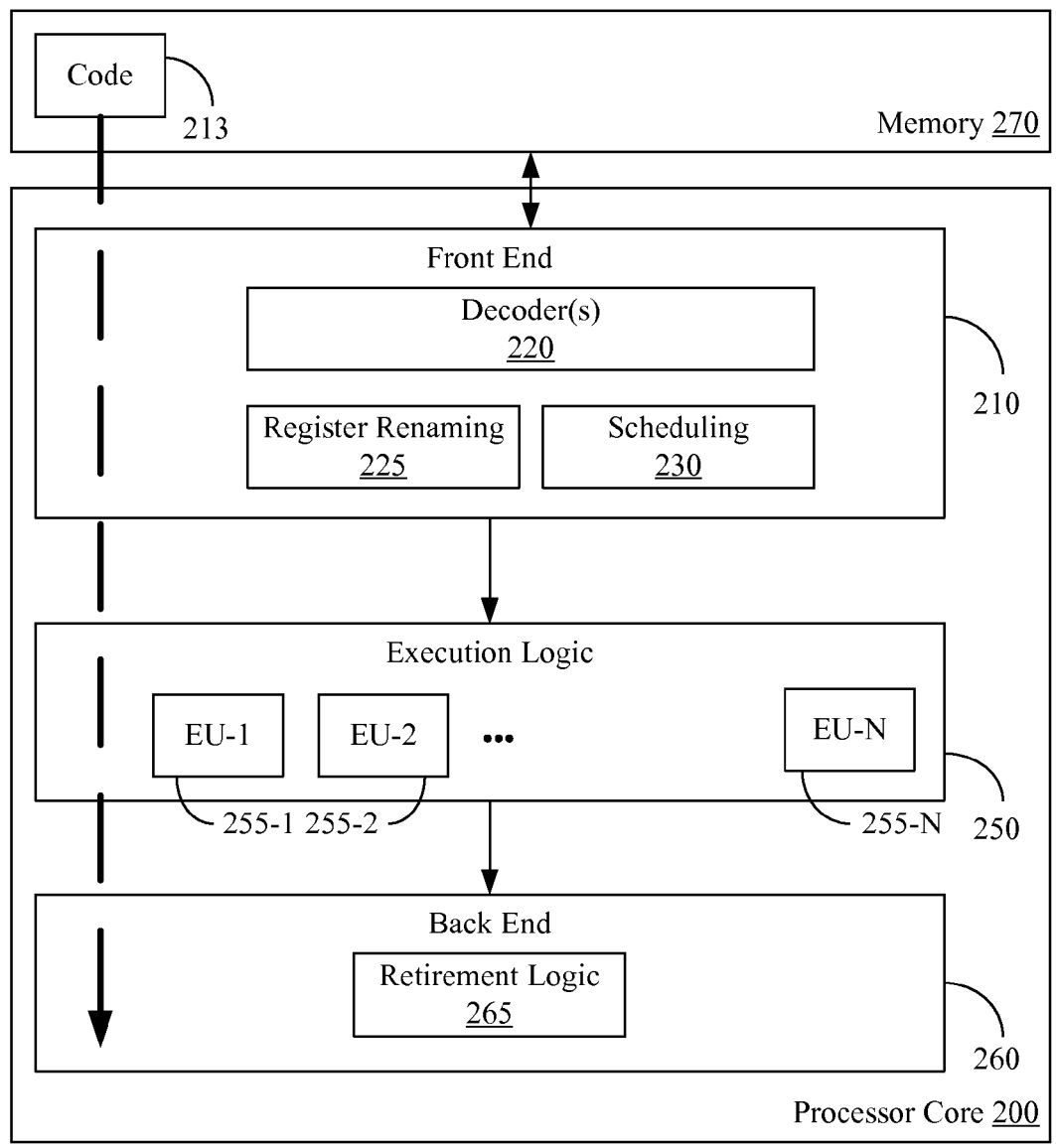
FIG. 5 is a block diagram of an example of a computing system according to an embodiment.

FIG. 5 illustrates a processor core 200 according to one embodiment. The processor core 200 may be the core for any type of processor, such as a micro-processor, an embedded processor, a digital signal processor (DSP), a network processor, a process virtual machine, or other device to execute code. Although only one processor core 200 is illustrated in FIG. 5, a processing element may alternatively include more than one of the processor core 200 illustrated in FIG. 5. The processor core 200 may be a single-threaded core or, for at least one embodiment, the processor core 200 may be multithreaded in that it may include more than one hardware thread context (or "logical processor") per core.

FIG. 5 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement the method 30 (FIG. 3), already discussed. In one example, the memory 270 is non-flash memory. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end portion 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 5, a processing element may include other elements on chip with the processor core

200. For example, a processing element may include memory control logic along with the processor core 200. The processing element may include I/O control logic and/or may include I/O control logic integrated with memory control logic. The processing element may also include one or more caches.

Figure 6:
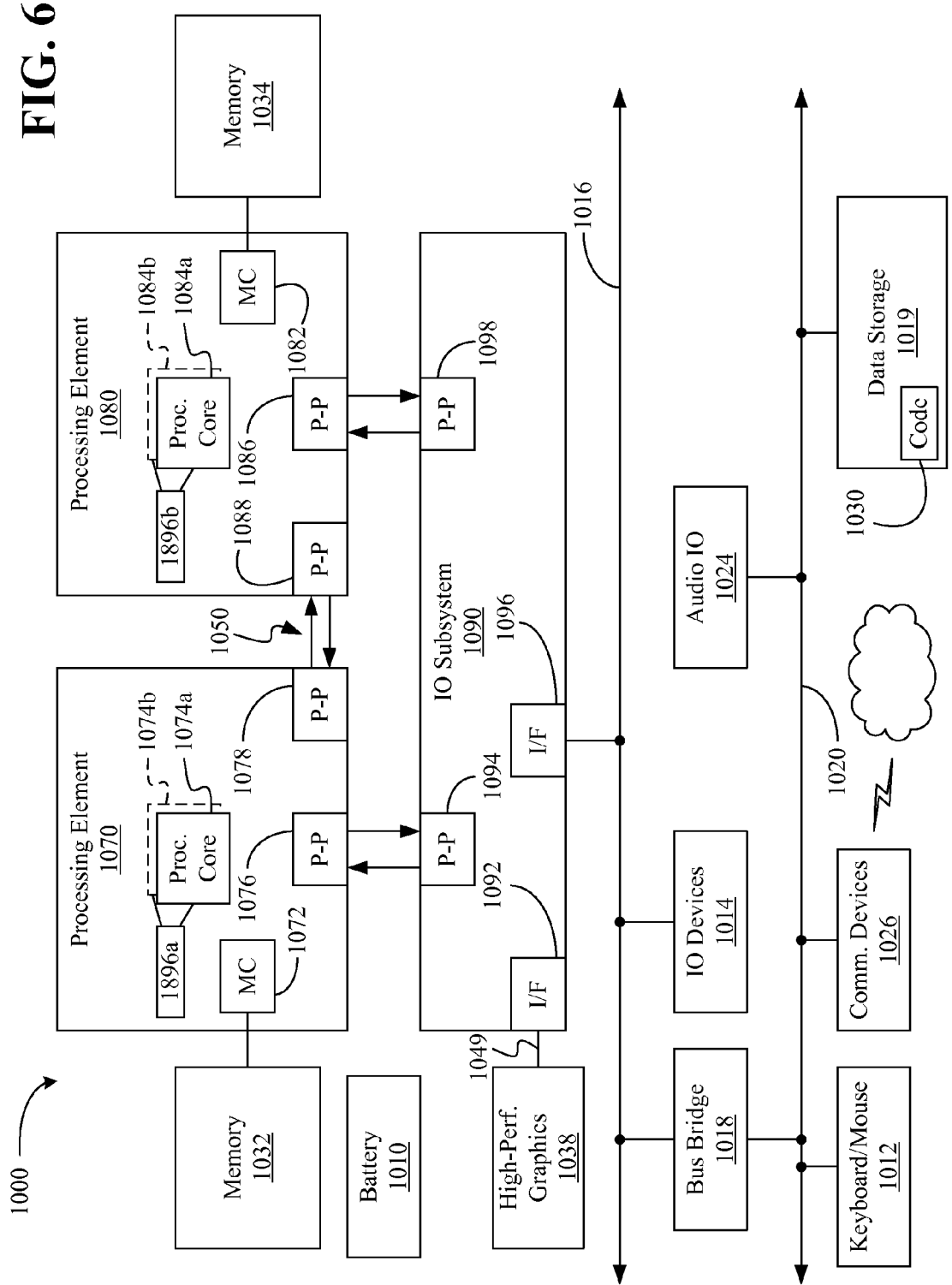
FIG. 6 is a block diagram of a computing system according to an embodiment.

Referring now to FIG. 6, shown is a block diagram of a computing system 1000 example in accordance with an embodiment. Shown in FIG. 6 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 6 may be implemented as a multi-drop bus rather than point-to-point interconnect.

As shown in FIG. 6, each of processing elements 1070 and 1080 may be multicore processors, including first and second processor cores (i.e., processor cores 1074*a* and 1074*b* and processor cores 1084*a* and 1084*b*). Such cores 1074*a*, 1074*b*, 1084*a*, 1084*b* may be configured to execute instruction code in a manner similar to that discussed above in connection with FIG. 5.

Each processing element 1070, 1080 may include at least one shared cache 1896*a*, 1896*b*. The shared cache 1896*a*, 1896*b* may store data (e.g., instructions) that are utilized by one or more components of the processor, such as the cores 1074*a*, 1074*b* and 1084*a*, 1084*b*, respectively. For example, the shared cache 1896*a*, 1896*b* may locally cache data stored in a memory 1032, 1034 for faster access by components of the processor. In one or more embodiments, the shared cache 1896*a*, 1896*b* may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 6, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 6, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 6, various I/O devices 1014 (e.g., cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, communication device(s) 1026, and a data storage unit 1019 such as a disk drive or other mass storage device which may include code 1030, in one embodiment. The illustrated code 1030 may implement the method 30 (FIG. 3), already discussed, and may be similar to the code 213 (FIG. 5), already discussed. Further, an audio I/O 1024 may be coupled to second bus 1020 and a battery 1010 may supply power to the computing system 1000.

Note that other embodiments are contemplated. For example, instead of the point-to-point architecture of FIG. 6, a system may implement a multi-drop bus or another such communication topology. Also, the elements of FIG. 6 may alternatively be partitioned using more or fewer integrated chips than shown in FIG. 6.

Additional Notes and Examples:

Example 1 may include a system to support refactoring, comprising a data flow interface to obtain a data flow graph application, a first outliner controller to profile the data flow graph application associated with source code using a runtime system and a graph library to obtain an original flow graph, an originator controller to create a map file based on one or more refactoring inputs, and a second outliner controller to re-profile the data flow graph application using the map file and a refactoring graph library to obtain a refactored flow graph.

Example 2 may include the system of Example 1, wherein the data flow graph is re-profiled without modifying the source code and one or more compiled executables associated with the data flow application.

Example 3 may include the system of Example 1, wherein the map file is created one or more of automatically or in response to a user refactoring input at runtime.

Example 4 may include the system of Example 1, wherein the originator controller is to use the refactoring graph library to interpret directions given by the map file.

Example 5 may include the system of Example 1, wherein the originator controller is to receive the refactoring inputs via a graphical user interface.

Example 6 may include the system of any one of Examples 1 to 5, wherein the map file is to describe how a structure of the original flow graph is related to a structure of the refactored flow graph, and wherein the refactoring inputs are to include one or more of a node aggregation input, a buffering node placement input, a concurrency input, a node limit input or a distributer node placement input.

Example 7 may include an apparatus to refactor a data flow graph application, comprising a first outliner to profile a data flow graph application associated with source code using a runtime system and a graph library to obtain an original flow graph, an originator to create a map file based on one or more refactoring inputs, and a second outliner to re-profile the data flow graph application using the map file and a refactoring graph library to obtain a refactored flow graph.

Example 8 may include the apparatus of Example 7, wherein the data flow graph may be re-profiled without modifying the source code and one or more compiled executables associated with the data flow application.

Example 9 may include the apparatus of Example 7, wherein the map file may be created one or more of automatically or in response to a user refactoring input at runtime.

Example 10 may include the apparatus of Example 7, wherein the originator may use the refactoring graph library to interpret directions given by the map file.

Example 11 may include the apparatus of Example 7, wherein the originator may receive the refactoring inputs via a graphical user interface.

Example 12 may include the apparatus of any one of Examples 7 to 11, wherein the map file may describe how a structure of the original flow graph may be related to a structure of the refactored flow graph, and wherein the refactoring inputs may include one or more of a node aggregation input, a buffering node placement input, a concurrency input, a node limit input or a distributer node placement input.

Example 13 may include a method to refactor data flow graph applications, comprising profiling a data flow graph application associated with source code using a runtime system and a graph library to obtain an original flow graph, creating a map file based on one or more refactoring inputs, and re-profiling the data flow graph application using the map file and a refactoring graph library to obtain a refactored flow graph.

Example 14 may include the method of Example 13, wherein the data flow graph application may be re-profiled without modifying the source code and one or more compiled executables associated with the data flow graph application.

Example 15 may include the method of Example 13, wherein the runtime system may create the map file one or more of automatically or in response to a user refactoring input at runtime.

Example 16 may include the method of Example 13, wherein creating the map file may include using the refactoring graph library to interpret directions given by the map file.

Example 17 may include the method of Example 13, further including receiving the refactoring inputs via a graphical user interface.

Example 18 may include the method of any one of Examples 13 to 17, wherein the map file may describe how a structure of the original flow graph may be related to a structure of the refactored flow graph, and wherein the refactoring inputs may include one or more of a node aggregation input, a buffering node placement input, a concurrency input, a node limit input or a distributer node placement input.

Example 19 may include at least one non-transitory computer readable storage medium comprising a set of instructions which, when executed by a computing system, may cause the computing system to profile a data flow graph application associated with source code using a runtime system and a graph library to obtain an original flow graph, create a map file based on one or more refactoring inputs, and re-profile the data flow graph application using the map file and a refactoring graph library to obtain a refactored flow graph.

Example 20 may include the at least one non-transitory computer readable storage medium of Example 19, wherein the data flow graph application is to be re-profiled without modifying the source code and one or more compiled executables associated with the data flow graph application.

Example 21 may include the at least one non-transitory computer readable storage medium of Example 19, wherein the runtime system is to create the map file one or more of automatically or in response to a user refactoring input at runtime.

Example 22 may include the at least one non-transitory computer readable storage medium of Example 19, wherein the instructions, when executed, may cause the computing system to use the refactoring graph library to interpret directions given by the map file.

Example 23 may include the at least one non-transitory computer readable storage medium of Example 19, wherein the instructions, when executed, may cause the computing system to receive the refactoring inputs via a graphical user interface.

Example 24 may include the at least one non-transitory computer readable storage medium of any one of Examples 19 to 23, wherein the map file is to describe how a structure of the original flow graph may be related to a structure of the refactored flow graph, and wherein the refactoring inputs are to include one or more of a node aggregation input, a buffering node placement input, a concurrency input, a node limit input or a distributer node placement input.

Example 25 may include an apparatus to refactor a data flow graph application, comprising means for performing the method of any one of Examples 13 to 18, in any combination or sub-combination thereof.

Embodiments are applicable for use with all types of semiconductor integrated circuit (IC) chips. Examples of these IC chips include but are not limited to processors, controllers, chipset components, programmable logic arrays, memory chips, network chips, systems on chips (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g. photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A, B, C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and the following claims.

We claim:

1. A system to support refactoring, comprising:
    a data flow interface to obtain a data flow graph application;
    a first outliner controller to profile the data flow graph application associated with source code using a runtime system and a graph library to obtain an original flow graph;
    an originator controller to create a map file based on one or more refactoring inputs; and
    a second outliner controller to re-profile the data flow graph application using the map file and a refactoring graph library to obtain a refactored flow graph, wherein the data flow graph is re-profiled without modifying the source code and one or more compiled executables associated with the data flow application.

2. The system of claim 1, wherein the map file is created one or more of automatically or in response to a user refactoring input at runtime.

3. The system of claim 1, wherein the originator controller is to use the refactoring graph library to interpret directions given by the map file.

4. The system of claim 1, wherein the originator controller is to receive the refactoring inputs via a graphical user interface.

5. The system of claim 1, wherein the map file is to describe how a structure of the original flow graph is related to a structure of the refactored flow graph, and wherein the refactoring inputs are to include one or more of a node aggregation input, a buffering node placement input, a concurrency input, a node limit input or a distributer node placement input.

6. An apparatus to refactor a data flow graph application, comprising:
    a first outliner controller to profile a data flow graph application associated with source code using a runtime system and a graph library to obtain an original flow graph;
    an originator controller to create a map file based on one or more refactoring inputs;
    and a second outliner controller to re-profile the data flow graph application using the map file and a refactoring graph library to obtain a refactored flow graph, wherein the data flow graph is re-profiled without modifying the source code and one or more compiled executables associated with the data flow application.

7. The apparatus of claim 6, wherein the map file is created one or more of automatically or in response to a user refactoring input at runtime.

8. The apparatus of claim 6, wherein the originator uses the refactoring graph library to interpret directions given by the map file.

9. The apparatus of claim 6, wherein the originator receives the refactoring inputs via a graphical user interface.

10. The apparatus of claim 6, wherein the map file describes how a structure of the original flow graph is related to a structure of the refactored flow graph, and wherein the refactoring inputs include one or more of a node aggregation input, a buffering node placement input, a concurrency input, a node limit input or a distributer node placement input.

11. A method to refactor data flow graph applications, comprising:
    profiling a data flow graph application associated with source code using a runtime system and a graph library to obtain an original flow graph;
    creating a map file based on one or more refactoring inputs; and
    re-profiling the data flow graph application using the map file and a refactoring graph library to obtain a refactored flow graph without modifying the source code and one or more compiled executables associated with the data flow graph application.

12. The method of claim 11, wherein the runtime system creates the map file one or more of automatically or in response to a user refactoring input at runtime.

13. The method of claim 11, further including receiving the refactoring inputs via a graphical user interface.

14. The method of claim 11, wherein the map file describes how a structure of the original flow graph is related to a structure of the refactored flow graph, and wherein the refactoring inputs include one or more of a node aggregation input, a buffering node placement input, a concurrency input, a node limit input or a distributer node placement input.

15. At least one non-transitory computer readable storage medium comprising a set of instructions which, when executed by a computing system, cause the computing system to:

profile a data flow graph application associated with source code using a runtime system and a graph library to obtain an original flow graph;

create a map file based on one or more refactoring inputs; and re-profile the data flow graph application using the map file and a refactoring graph library to obtain a refactored flow graph, wherein the data flow graph application is to be re-profiled without modifying the source code and one or more compiled executables associated with the data flow graph application.

16. The at least one non-transitory computer readable storage medium of claim 15, wherein the runtime system is to create the map file one or more of automatically or in response to a user refactoring input at runtime.

17. The at least one non-transitory computer readable storage medium of claim 15, wherein the instructions, when executed, cause the computing system to use the refactoring graph library to interpret directions given by the map file.

18. The at least one non-transitory computer readable storage medium of claim 15, wherein the instructions, when executed, cause the computing system to receive the refactoring inputs via a graphical user interface.

19. The at least one non-transitory computer readable storage medium of claim 15, wherein the map file is to describe how a structure of the original flow graph is related to a structure of the refactored flow graph, and wherein the refactoring inputs are to include one or more of a node aggregation input, a buffering node placement input, a concurrency input, a node limit input or a distributer node placement input.

* * * * *